United States Patent [19]
Hodgson et al.

[11] Patent Number: 5,694,830
[45] Date of Patent: Dec. 9, 1997

[54] AUTOMATED CORN POPPER

[75] Inventors: Lee Kindley Hodgson, Cincinnati; Ronald R. Weiss, Okeana, both of Ohio

[73] Assignee: Gold Medal Products Co., Cincinnati, Ohio

[21] Appl. No.: 345,303

[22] Filed: Nov. 28, 1994

[51] Int. Cl.$^6$ ........................................................ A23L 1/18
[52] U.S. Cl. .......................................... 99/323.7; 99/323.9
[58] Field of Search ............................ 99/323.4, 323.11, 99/484, 348; 222/150 A, 150 R, 150 HC

[56] References Cited

U.S. PATENT DOCUMENTS

| | | |
|---|---|---|
| 1,218,341 | 3/1917 | Truitt . |
| 1,477,704 | 12/1923 | Holcomb et al. . |
| 1,545,357 | 7/1925 | Schwimmer . |
| 1,704,133 | 3/1929 | Le Claire . |
| 1,789,902 | 1/1931 | Jackson ............................ 99/323.7 |
| 1,977,831 | 10/1934 | Marshall et al. . |
| 2,017,293 | 10/1935 | Priest . |
| 2,027,698 | 1/1936 | Parks et al. ..................... 99/323.7 |
| 2,034,484 | 3/1936 | Pagendarm . |
| 2,123,663 | 7/1938 | Roach . |
| 2,134,682 | 11/1938 | Burch ............................... 99/323.7 |
| 2,230,460 | 2/1941 | Kleinwachter . |
| 2,232,954 | 2/1941 | Manley . |
| 2,248,812 | 7/1941 | Cretors ........................... 99/323.7 |
| 2,254,271 | 9/1941 | Cretors . |
| 2,458,190 | 1/1949 | Newburger . |
| 2,529,877 | 11/1950 | Ladge . |
| 2,536,298 | 1/1951 | Manley ............................. 99/323.9 |
| 2,575,643 | 11/1951 | Tamsen . |
| 2,646,189 | 7/1953 | Wickesberg . |
| 2,812,704 | 11/1957 | Hawks . |
| 2,856,841 | 10/1958 | Cretors et al. . |
| 2,859,015 | 11/1958 | Spangler . |
| 2,939,379 | 6/1960 | Schmitt . |
| 2,972,292 | 2/1961 | Waas et al. . |
| 2,984,169 | 5/1961 | Bushway . |
| 3,102,032 | 8/1963 | Lippert . |
| 3,120,168 | 2/1964 | Lippert . |
| 3,197,076 | 7/1965 | Chamblee . |
| 3,223,291 | 12/1965 | Thomas . |
| 3,253,532 | 5/1966 | Jones . |
| 3,253,747 | 5/1966 | Thomas . |
| 3,254,800 | 6/1966 | Baunach . |
| 3,282,470 | 11/1966 | Thomas . |
| 3,294,546 | 12/1966 | Fingerhut . |
| 3,321,107 | 5/1967 | Govin et al. . |
| 3,554,115 | 1/1971 | Manley et al. . |
| 3,584,586 | 6/1971 | Manley et al. . |
| 3,641,916 | 2/1972 | McDevitt et al. . |
| 3,645,422 | 2/1972 | Cretors . |
| 3,697,289 | 10/1972 | Day et al. . |
| 3,739,953 | 6/1973 | Cretors . |
| 3,783,820 | 1/1974 | Hautly et al. . |
| 3,812,774 | 5/1974 | Day et al. . |
| 3,930,966 | 1/1976 | Takahashi et al. . |
| 4,094,446 | 6/1978 | Brutsman . |
| 4,133,456 | 1/1979 | Corini . |
| 4,171,066 | 10/1979 | Hirose . |
| 4,171,667 | 10/1979 | Miller et al. . |
| 4,182,229 | 1/1980 | VandeWalker . |
| 4,206,695 | 6/1980 | Cretors ........................... 99/323.9 |
| 4,372,354 | 2/1983 | Moore . |
| 4,421,146 | 12/1983 | Bond et al. . |
| 4,426,923 | 1/1984 | Ohata . |
| 4,477,003 | 10/1984 | Baker et al. . |

(List continued on next page.)

FOREIGN PATENT DOCUMENTS

| | | |
|---|---|---|
| 682731 | 3/1964 | Canada . |
| 364-071 | 7/1989 | European Pat. Off. . |

*Primary Examiner*—Timothy F. Simone
*Attorney, Agent, or Firm*—Wood, Herron & Evans, L.L.P.

[57] ABSTRACT

An automated batch popcorn popper includes a tiltable kettle actuated by a motor drive controlled to operate in a single batch and automatic dump process. An operator fills the kettle with popping corn and oil and initiates a timer which, controls popping and automatically dumps the popped popcorn into the popper cabinet. This eliminates burnt batches, and the need for constant operator attention while increasing production. Apparatus and methods are disclosed.

20 Claims, 4 Drawing Sheets

U.S. PATENT DOCUMENTS

| | | |
|---|---|---|
| 4,484,697 | 11/1984 | Fry, Jr. . |
| 4,557,399 | 12/1985 | Redick, Jr. . |
| 4,632,275 | 12/1986 | Parks . |
| 4,723,688 | 2/1988 | Munoz . |
| 4,727,798 | 3/1988 | Nakamura . |
| 4,850,120 | 7/1989 | Stein . |
| 4,919,308 | 4/1990 | Majkrzak . |
| 5,026,969 | 6/1991 | Knepler et al. . |
| 5,033,363 | 7/1991 | King et al. . |
| 5,035,173 | 7/1991 | Stein et al. . |
| 5,114,045 | 5/1992 | Herpe . |
| 5,121,857 | 6/1992 | Hutchinson . |
| 5,301,601 | 4/1994 | Cretors . |

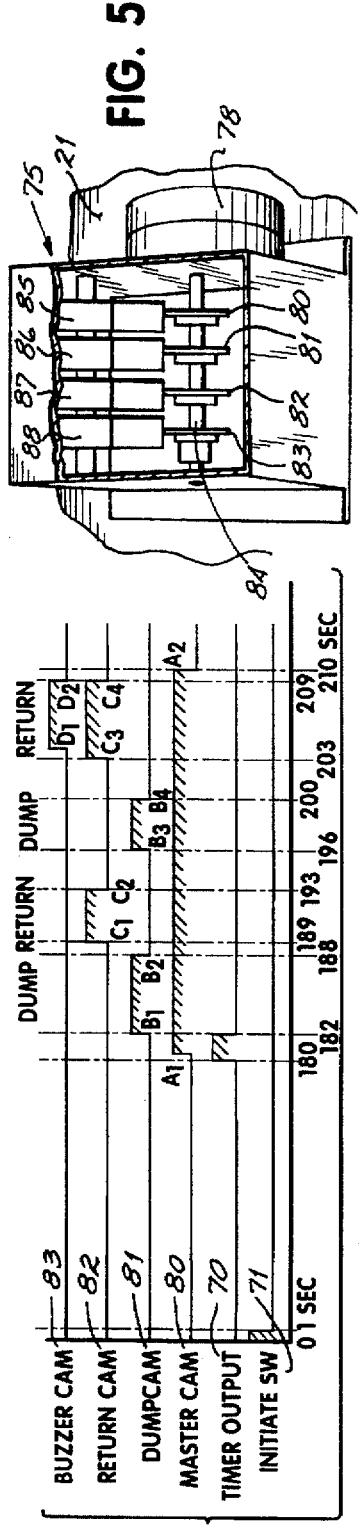
FIG. 5
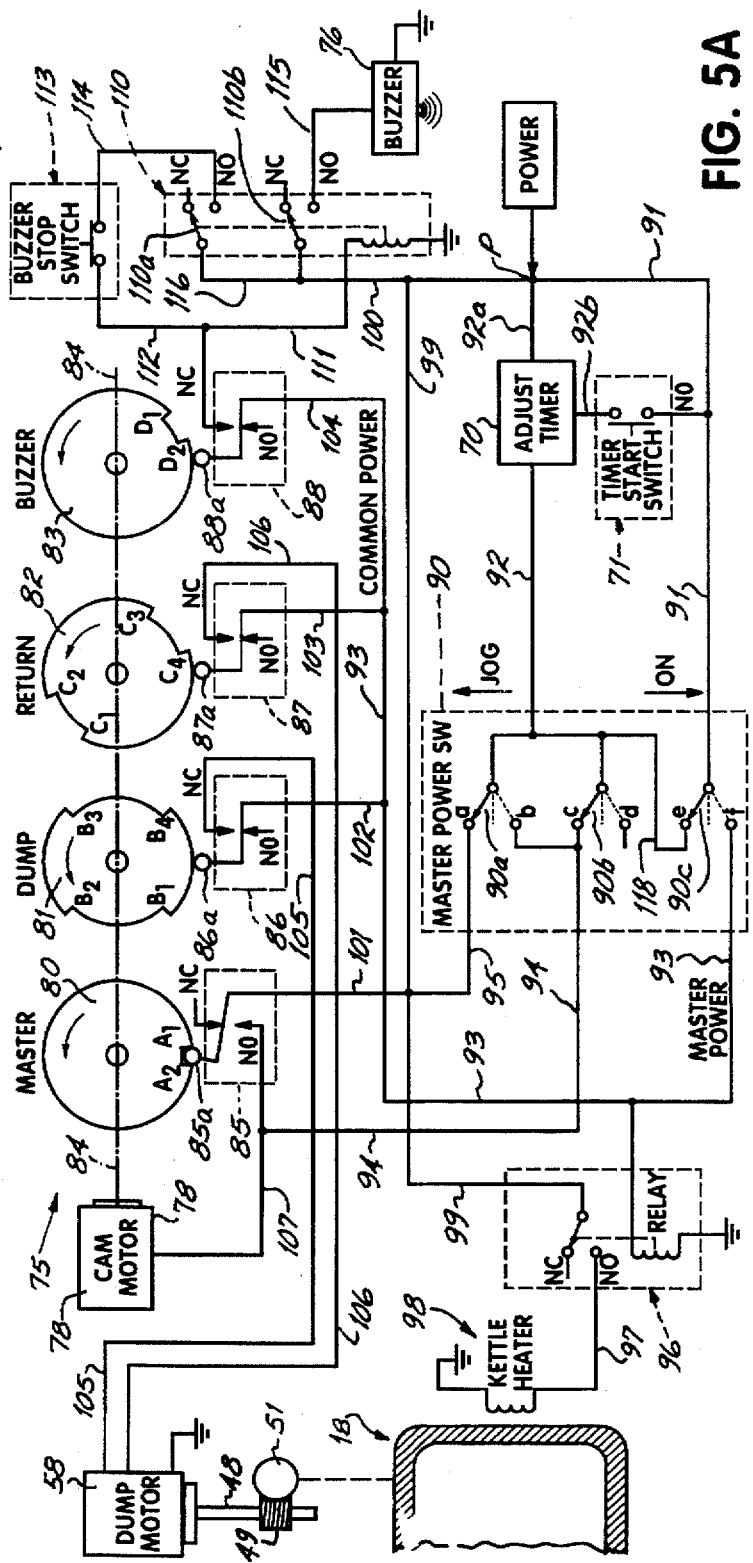
FIG. 6
FIG. 5A

AUTOMATED CORN POPPER

BACKGROUND OF THE INVENTION

This invention relates to popcorn popping and more particularly to the popping of popcorn in consecutive batches.

In the past, concessionaires have popped corn in integrated machines containing a tippable, heated kettle with a driven rotor and hinged top. The kettle is mounted in a transparent sided cabinet. When the popcorn is cooked, the operator manipulates a handle to tip the kettle and dump the popcorn. He then reloads the kettle with additional popping oil and unpopped corn for another cooking and manual dumping cycle in order to keep up with the demand for popcorn from the cabinet.

While such machines are useful, the operator's constant attention is required in order to prevent, for example, the undesirable result of burning or overcooking the corn. The aroma of burnt popcorn is not attractive and decreases sales. Also, burnt popcorn makes the kettle hard to clean.

The nature of the concessionaires' duties is not conducive to the constant attention required to the popping operation. For example, his attention is typically diverted to servicing customers for popped popcorn or other products, making change and numerous other activities. Meanwhile, the hot kettle is popping the corn and can burn it quickly with little notice to the operator. Once the corn is burnt, there is no easy way to clean up the resultant mess. The kettle is hot and takes some time to cool, and dumping the burnt corn contaminates the other warmed popcorn in the cabinet. Moreover, there can be delays between popping cycles due to lack of immediate attention to the corn popping, the operator delaying the start of another cycle until he has an undisturbed period to handle it. This interrupts and reduces production rates.

Accordingly, it has been one objective of this invention to provide apparatus and/or methods for popping popcorn in consecutive batches without burning the popcorn.

A further objective of the invention has been to provide improved corn popping apparatus and/or methods.

A further objective of the invention has been to provide improved kettle handling apparatus in a corn popping apparatus.

A further objective of the invention has been to provide improved apparatus for popping popcorn batches at increased production rates.

A further objection of the invention has been to provide apparatus for popping sequential batches of popcorn without requiring constant operator attention during the popping cycles.

A still further objective of the invention has been to provide apparatus and methods for decreasing the time periods between operating cycles of a popcorn popper.

SUMMARY OF THE INVENTION

To these ends, a preferred embodiment of the invention includes a heated, tiltable popping kettle operatively coupled to a motor for mechanically, as opposed to manually, dumping the kettle. A motor control is provided to allow a preset cook time and to automatically operate the motor to twice tilt and dump the kettle without human operator input, and to insure a complete dump, thus avoiding inadvertent burning or overcooking. Since the cook and dump cycles are timed, production is increased. An operator must no longer await for a time period when he can watch over the cooking process.

Preferably, the motor is controlled to dump the kettle twice to insure complete dumping. After the first dump, the kettle is only partially returned toward a cooking or popping position. It is then dumped again before fully returning to a popping position.

A controller, solid state or mechanical, controls the cooking and dump cycles and is automatically reset, if power is interrupted, along with the kettle to avoid subsequent loading or corn and oil in mid-cycle.

The kettle is hung from a drive housing and has a boss rotatably received in a drive housing socket for supporting the kettle. A driven drive stub engages the boss to tilt it, or return it, upon motor rotation in a respective direction. A flexible spring-like hanger supports the opposite side of the kettle from the drive boss, serving to urge the kettle boss into the socket, and yielding for kettle removal once the kettle is partially rotated to align the drive stub for decoupling from the boss. Kettle removal for cleaning is thus facilitated.

Accordingly, the cooking and dumping of popcorn is automated and no longer requires direct or constant supervision to avoid burning. Production of consistently popped corn is enhanced and production rates improved.

It is only necessary for an operator, between batches, to load the kettle with corn and oil and initiate the cycle time, upon which corn is automatically and consistently popped and dumped from batch to batch.

These and other objectives and advantages will become readily apparent from the following detailed description of a preferred embodiment of the invention and from the drawings in which:

FIG. 5 is an illustrative diagram of the cam controller according to the invention;

FIG. 5A is a diagrammatic view illustrating control features and circuitry according to a preferred embodiment of the invention;

FIG. 6 is a timing chart illustrating the operation of the cam controller and dump and return control switches.

Figure 1:
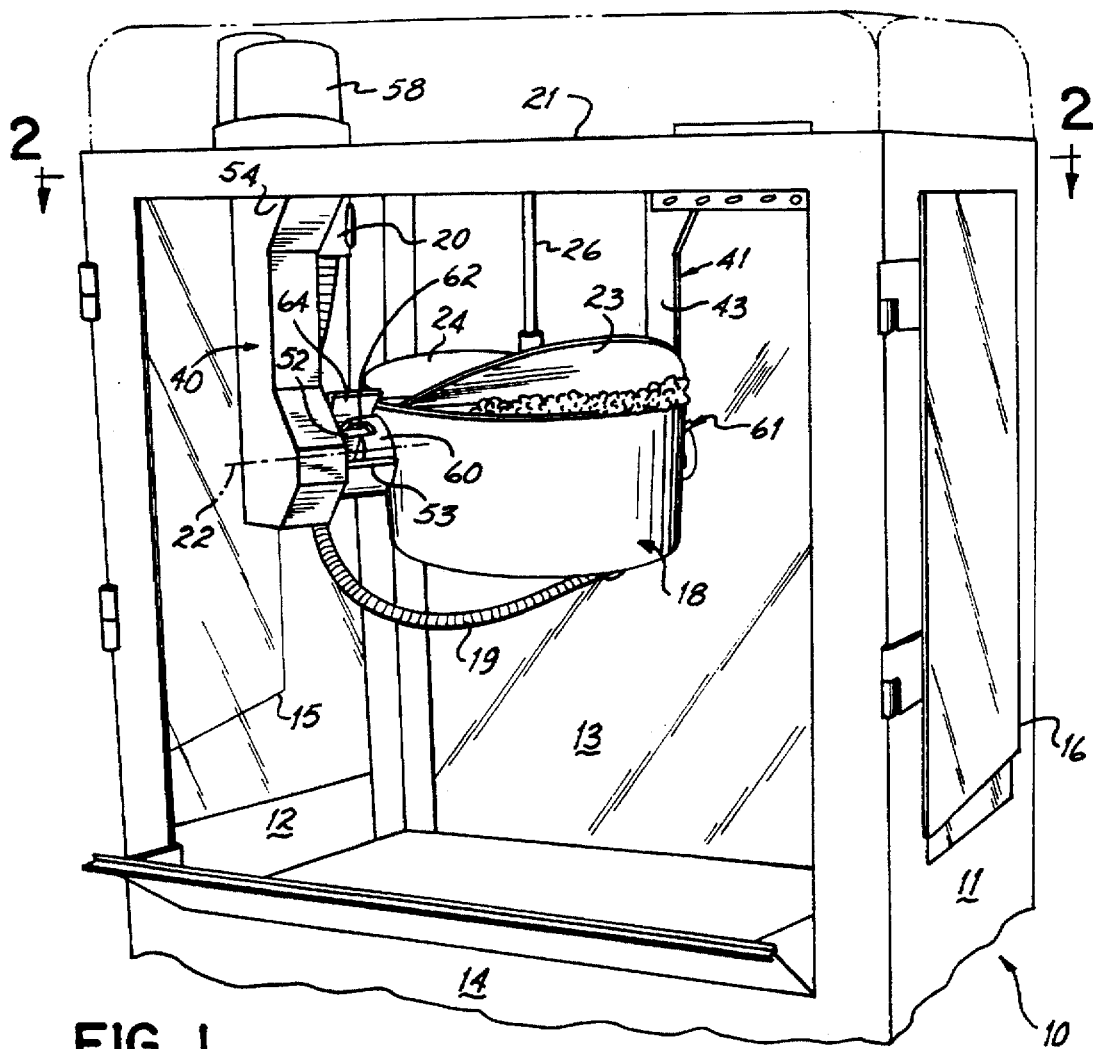
FIG. 1 is a perspective view of a popcorn machine according to the invention.

Turning now to the drawings, there is shown in FIG. 1 an automated corn popper 10 according to the invention. It will be appreciated that the popper is operable to cook or to pop popcorn and is particularly useful for cooking batches of popcorn for sale for use by concessionaires at movie theaters, sport events, fairs and the like.

The corn popper 10 includes a cabinet having two sidewalls 11, 12, a rear wall 13, and front wall 14. Front wall 14 may comprise two doors 15, 16, which can be opened to gain access, both to the popped corn in the bottom of the cabinet and to the kettle 18. Sidewalls 11, 12 and rear wall 13, as well as the front wall 14 including doors 15, 16, are all made preferably of transparent glass or plastic material so that the interior of the cabinet can be viewed from the exterior.

Figure 2:
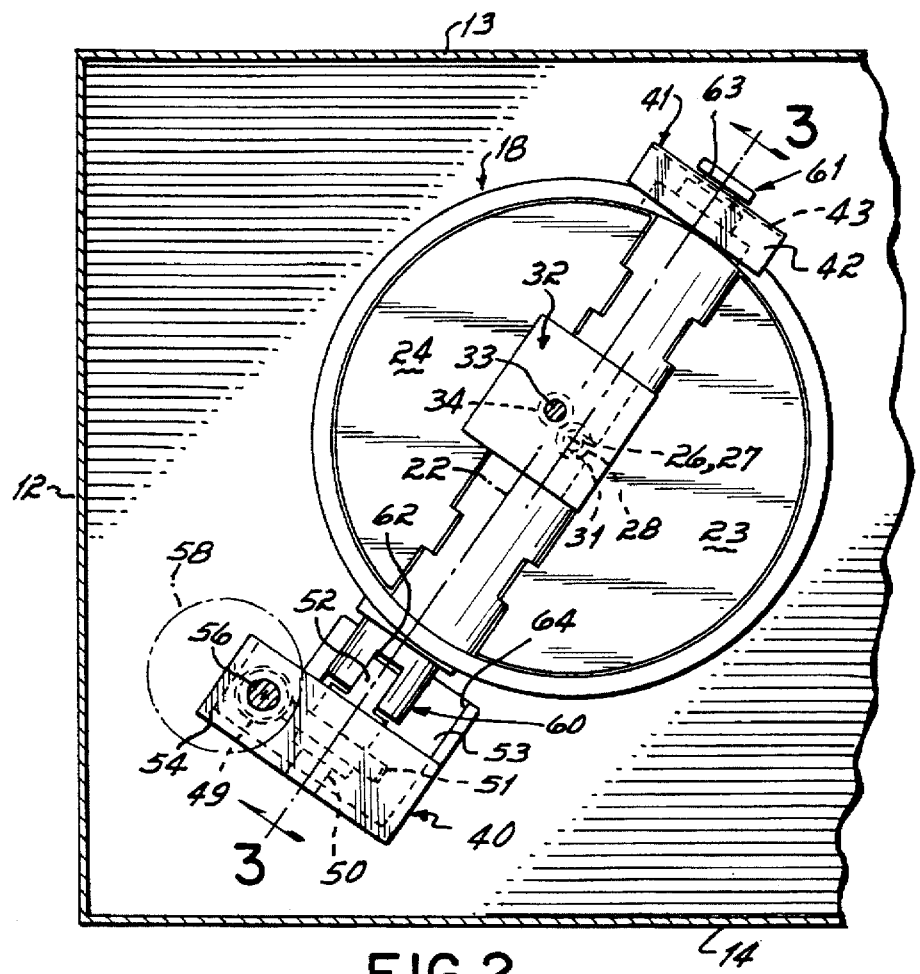
FIG. 2 is a cross sectional view of a popcorn popping kettle as seen on line 2—2 of FIG. 1.

The popping kettle 18 is of any suitable variety having a heater (not shown) interconnected by a power cord 19 to a power plug 20 mounted inside on the top 21 of the cabinet. It will be appreciated that the kettle is tiltable about a tilt axis 22 (FIG. 2) and is provided with covers 23 and 24 which are pivoted on the kettle. When the corn is popped, it can push these covers open and fall out the sides of the kettle. Moreover, it will be appreciated that the cover 23 is located over a so-called "dump section" or side of the kettle 18. When the kettle is tilted, this cover pivots open to facilitate dumping.

The kettle includes an internal agitator, stir blade or rotor (not shown) driven by a rotor drive shaft 26 having an upper pilot end 27 and a drive gear 28 thereon. When the kettle is in a cooking position as shown in FIG. 1, the upper pilot end 27 of the rotor drive shaft 26 is located in a socket 31 defined in a rotor drive housing 32 and mounting the drive shaft 33 and the drive gear 34. The drive gear 34 intermeshes with the drive gear 28 on the upper pilot end 27 of the rotor drive shaft 26 to drive the rotor within the kettle to promote popping.

The kettle is mounted in the cabinet of the popper 10 by way of a drive housing 40 and a spring-like hanger bracket 41. The spring-like hanger bracket 41 includes an L-shaped bracket having a foot 42 for interconnection to the top 21 of the cabinet. The depending flat spring leg 43 is provided with an aperture or slot 44, as will be further described.

Figure 1A:
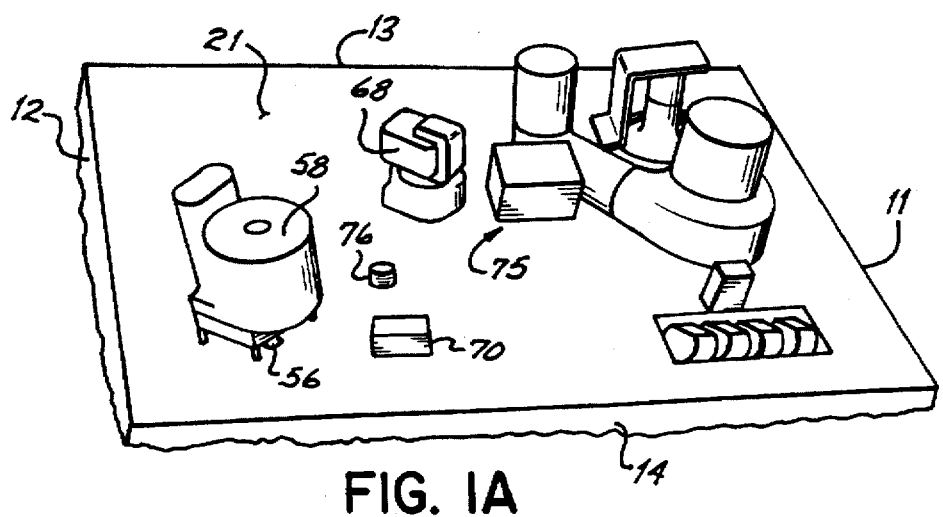
FIG. 1A is a perspective view of the top of the popcorn machine of FIG. 1.
Figure 3:
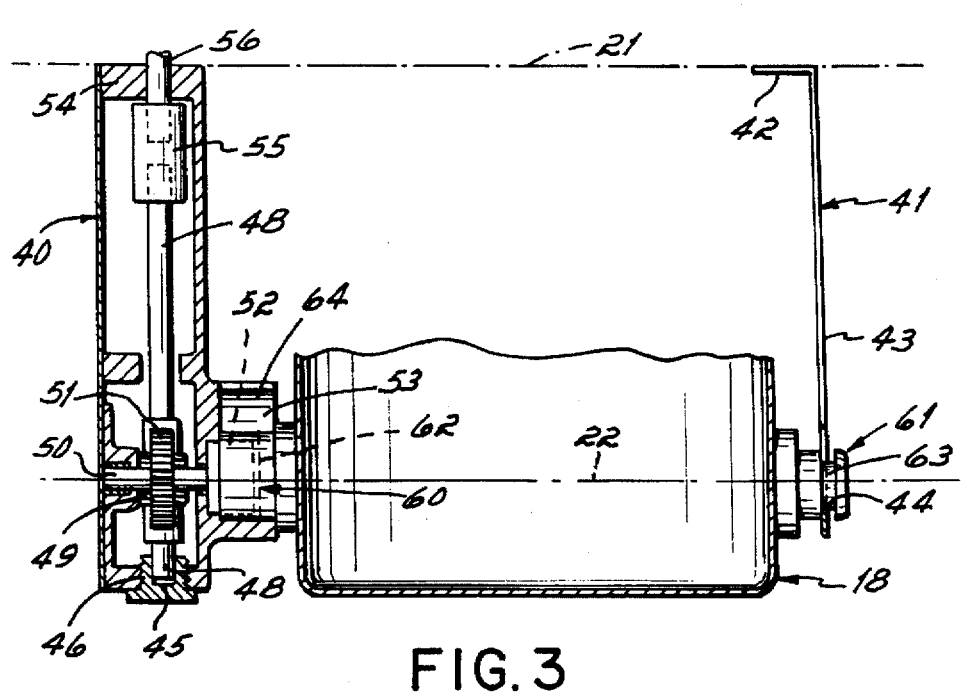
FIG. 3 is a cross-section taken along lines 3—3 of FIG. 2.
Figure 4:
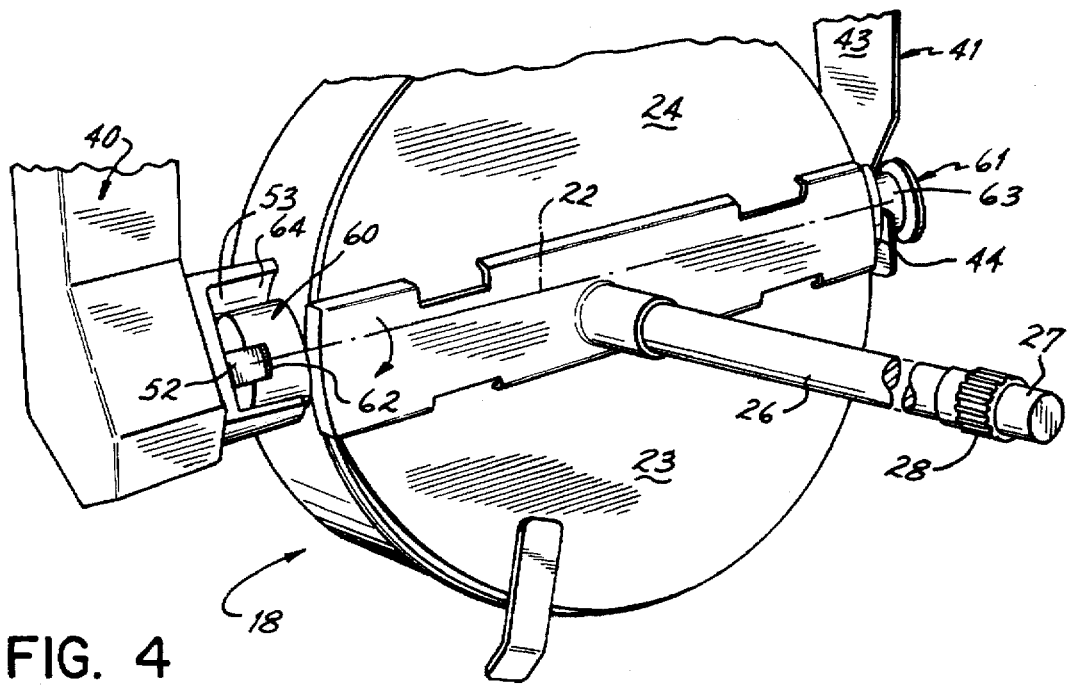
FIG. 4 is a fragmentary view similar to FIG. 1, but showing the kettle in a full dump position.
Figure 7:
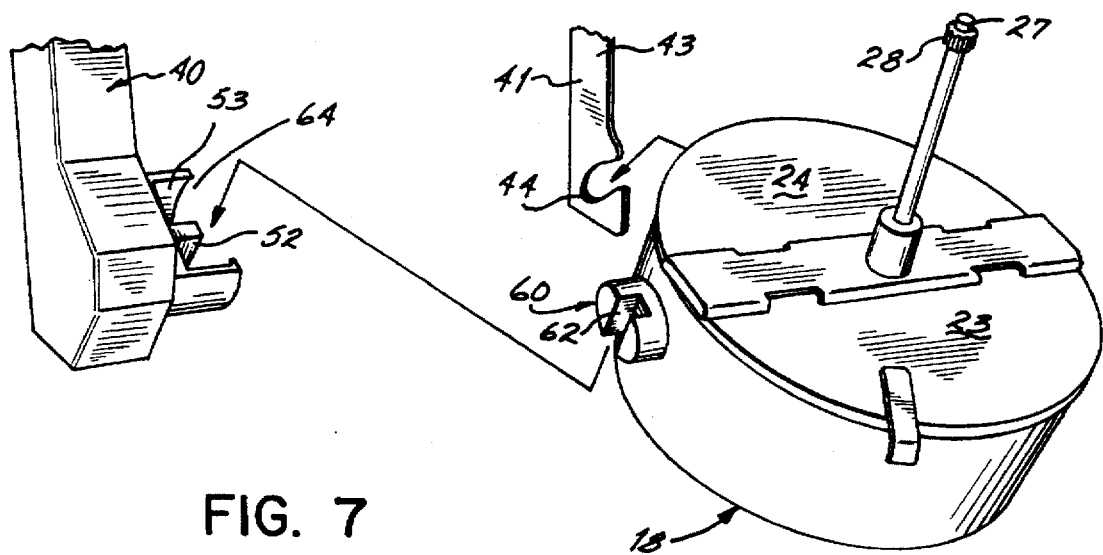
FIG. 7 is a fragmentary view similar to FIG. 1 but showing the kettle removed.

On the other side of the kettle, the drive housing 40 houses the drive shaft 48, which is provided with a worm gear 49 on the bottom end thereof. A drive stub shaft 50 is provided with a gear 51 for intermeshing with the worm gear 49. The opposite end of the drive stub shaft 50 is provided with a drive stub 52 disposed in a socket 53 of the drive housing 40. The upper end of the drive housing 40 is provided with a mounting foot 54 for securing the drive housing 40 to the top 21 of the cabinet of the popper 10. In addition, it will be appreciated that the drive shaft 48 can be a one-piece drive shaft or it can be coupled through a coupling 55 to the depending drive shaft 56 of a tilt motor 58 (FIGS. 1 and 1A). Drive shaft 48 is journaled in a blind bore 45 located in an externally threaded bushing 46 in the bottom of housing 40 (FIG. 3). This prevents lubricants from leaking into the popped pop corn.

The kettle 18 is provided with a drive boss 60 and a hanger boss 61. The drive boss 60 is provided with a slot 62 for receiving the drive stub 52, supported by the drive housing 40. The hanger boss 61 extends from the other side of the kettle with respect to the drive boss 60 and is provided with a groove 63 for receiving the depending leg 43 of the hanger bracket 41. In this regard, the groove 63 fits within a socket or aperture 44 of the hanger bracket 41 so that the kettle can be rotated about the pivot axis 22. At the other drive side of the kettle, the drive boss 60 resides in the socket 53, defined by the drive housing 40, so that the drive boss 60 can rotate in that socket. It will be appreciated that the socket has an opening 64 for accommodating radial movement of the drive boss 60 with respect to the socket and to the drive stub 52 when the drive stub 52 and the recess 62 in the drive boss 60 are aligned with the opening 64 to permit the drive boss to be moved outwardly of the socket.

Alternatively, the kettle could be supported in a cantilevered fashion only by the drive boss or other supporting apparatus as will be appreciated.

Turning now momentarily to FIG. 1A, there is shown a perspective view of the top of the popper 10 showing various components of the popper mounted outside the cabinet on the top 21 thereof. As shown in FIG. 1A, the tilt motor 58 is mounted on the top 21, such that drive shaft 56 extends downwardly through the top 21 and into the drive housing 40 (FIG. 3). A rotor drive motor 68 is also positioned on the top 21 so that its drive shaft 33 extends downwardly through the top 21 and through the housing 32 for interconnection with the drive gear 34. A timer 70 is positioned preferably on the top 21 as shown, as well as a cam controller 75, other various switches, warming lights and fans as well as various circuitry. Timer 70 is preferably a solid state timer capable of timing a popping or cooking cycle of about 3 minutes or so and then initiating a power signal, responsive to completion of the preset time period, for a relative short duration of a few seconds. One such suitable timer is a multi-mode time delay relay available from SSAC of Baldwinsville, N.Y. under its series designation, TRDU series. Any suitable timer can be used. Terminal blocks, as necessary, can also be mounted on the top. An audible signal generator such as a buzzer 76 is also mounted on the top 21.

Turning now to FIG. 5A, there is shown therein a cam and control circuit schematic illustration of the controller 75, together with other features of the invention as noted. The controller 75 can be any suitable form of controller which would provide the function and operation of the invention as is described herein. Accordingly, the controller could be a solid state electronic controller or any other form of suitable controller. For purposes of illustration only, applicant 15 has described herein one form of cam-type controller which has been found suitable for use in connection with this invention. This cam controller is purchased from the American Control Products Division of Precision Timer Co., Inc. of West Burke, Conn. under its model no. 130-4W2/15SD6, with respective cams therein according to the following description. In particular, such a cam controller 75 includes a controller motor 78 and four cams. These cams are mounted on a shaft 84 driven by motor 78.

Operatively positioned proximate each of the cams 80–83 is an associated switch, such as master switch 85, dump switch 86, return switch 87 and buzzer switch 88. Each such switch has a normally open and a normally closed position as will be appreciated.

A manually operated master power switch 90 is provided as shown in FIG. 5A. Switch 90 is a double throw, triple pole switch having momentary power in one contact ("jog") position, a center off position, and a maintained contact in another or "master on" position. One side of this switch 90 is connected through line 91 to a power source contact P. This switch has three contact arms 90a, 90b and 90c each of which have three positions indicated by the solid and dotted lines as shown.

Timer 70 is selectively connected between switch 90 and power source P through lines 92 and 92a. Also, normally open timer start switch 71 is connected serially in line 92b between power line 91 and the timer.

Master power switch 90 is selectively connectable to three output lines, 93, 94 and 95. Output line 93 comprises a common power output line energized when switch 90 is turned on for normal operation. A normally open relay switch 96 is interconnected for closing upon application of electrical power to relay 96 in order to power up, through line 97, a kettle heater 98. Electrical power to line 97 through switch 96 is obtained through lines 99 and 100 from a power source contact P. Line 94 provides selective power to the motor 78 of the cam. Controller 75 and line 95 is used selectively to provide power to cam motor 78 as will be described.

Switch 90 is a three position switch having a center "off" position in which no electrical power is transmitted through the switch. The movable switch contacts can be moved up, as shown in FIG. 5A, into a second or "jog" position and manually held there. The switch is spring loaded to automatically move back to its center "off" position when manual pressure is released. A third switch position is an "on" position where the switch contacts are moved down to a maintaned contact as shown in the lower dotted lines in FIG. 5A.

Each of the switches 85, 86, 87 and 88 are connected to a common power line 93, for energization through master switch 90 when in its "on" or down position, through respective lines 101, 102, 103 and 104.

Dump or tilt motor 58 is selectively powered to rotate in a tilt or dump direction through power line 105 and to rotate in a return direction through power line 106 when the respective switches 86 or 87 are closed, as will be described.

Cam motor 78 is energized through power line 107 when switch 85 is closed by master cam 80 as will be explained.

A buzzer relay switch 110 is selectively energized by switch 88 through line 111. This closes both sets of N.O. contacts in relay 110. The buzzer is initiated through line 112, buzzer stop switch 113, line 114 and line 115. Once cam 83 rotates detent $D_2$ past arm 88a, switch 88 opens and the relay stays closed via the upper latching contact set. Buzzer stop switch 113 is spring loaded to a normally closed position, but can be pushed at any time to disconnect and stop buzzer 76 from power source contact P.

Operation

Operation of the preferred embodiment will now be described.

Reference to both FIGS. 5A and 6 will be helpful. In FIG. 6 the cross-sectioned areas indicate duration of switch closures as will be explained. Also, the cam detent positions $A_1$-$A_2$, $B_1$-$B_4$, $C_1$-$C_4$, $D_1$-$D_2$ as shown in FIG. 5A are applied to FIG. 6 for clarity. Finally, it will be appreciated that the full cook and dump cycle lasts about 3½ minutes or 210 seconds. Operations herein are sometimes referred to at particular seconds.

It will also be appreciated that the duration of the switch operation by the cams 80-83 are a function of the rotational speeds of the shaft 84 and the cams thereon as well as the relative angular orientation of the detent position.

When it is desired to run the apparatus, the master power switch 90 is turned on. This conducts power to common power line 93 and to relay switch 96 which closes to conduct power through lines 100, 99 and 97 to the kettle heater. Assuming cam 80 is in its zero position, switch 85 is open and no power is available to cam motor 78. Specifically, no power is available to line 107 and motor 78 through contact arm 90a, contact b, and line 94 since there is no power pulse through line 92 and timer 70.

Automatic Reset

If the apparatus was left in any other position than a start or zero position, arm 85a will be up on cam 80 and not in the detent. This will have closed switch 85, thus conducting power to cam controller motor 78 through lines 91, 93, 101 and 107. This will cause cam motor 78 to run through the remainder of its cycle until the arm 85a falls into cam detent $A_1$-$A_2$, disconnecting the cam motor 78.

Thus, the apparatus including the kettle and its cycle control will always reset whenever power is reapplied to the apparatus after any power failure or master switch off condition.

Normal Start

Assuming, however, that the cam 80 and the other cams 81, 82 and 83 are in their zero or start positions as illustrated in FIG. 5A, once power turns on, the kettle heats but nothing else happens since switch 85 is open and no power is available to line 107. At this point, contact arm 90a has moved to contact c in switch 90 but line 94 is not powered since no power is conducted into line 92 by timer 70.

The operator then fills kettle 18 with popcorn and oil and depresses timer start switch 71. This causes timer 70 to start timing.

1st Dump

After a timed cooking duration, of about 180 seconds, a power pulse of short duration (i.e. from 180 seconds to 182 seconds in FIG. 6) is initiated by timer 70 through lines 92, contact arm 90a, contact b line 94 and line 107 to cam motor 78, This initially rotates shaft 84 turning cam 80 and detent position $A_2$ past arm 85a closing switch 85. Power to cam motor 78 is then through line 91, contact arm 90c, line 93, line 101 switch 85 and line 107, whereupon the cam motor 78 continues to run for the full dump cycle. No more power is available to motor 78 through line 94 since the timer initiation pulse is of short duration (FIG. 6), Once timer 70 times out and starts motor 78, detent $B_1$ on cam 81 reaches arm 86a (at about 182 seconds). Switch 86 closes to energize dump motor 58 through lines 105 to tilt and rotate kettle 18 to a full dump position. When detent $B_2$ reaches arm 86a at about second 188, switch 86 opens, stopping motor 58, This results in a dump motor run of about 6 seconds' duration.

1st Return (Partial)

To allow motor 58 to stop, there is a short delay, due to the respective angular orientation of detent position $B_2$ to detent position $C_1$ on cam 82. Once position $C_1$ moves into arm 87a, it falls into detent $C_1$-$C_2$ (at about second 189). This closes switch 87 and reverses motor 58 through lines 93, 103 and 106 to partially return kettle 18 to a partially but not fully return position. When detent position $C_2$ passes arm 87a, at about second 193, switch 87 is opened, stopping motor 58. Thus, motor 58 is run only about 4 seconds to partially return kettle 18 to a cooking position. This partial return is obvious to the operator and prevents him from believing the kettle is in a zero or start position. So the operator is not misled and will not prematurely load popcorn and oil into the kettle.

2nd Dump

After another short duration due to the respective angular orientation of detent position $C_2$ on cam 82 and $B_3$ on cam 81, the arm 86a falls past detent position $B_3$ at about second 196, to again close switch 86 and energize dump motor 58 through lines 105.

After a duration of about 4 seconds from about second 196 to second 200, detent position $B_4$ rotates past arm 86a opening switch 86 and stopping motor 58.

Final Full Return

After a further delay of about 3 seconds from second 200 to second 203, cam 82 has now rotated detent position $C_3$ past arm 87a which closes switch 87 and powers motor 58 through line 106 to fully return the kettle 18 to a cooking position. As cam 82 rotates detent position $C_4$ past arm 87a at about second 209, switch 87 is opened to stop motor 58.

Thus, the kettle 18 is rotated to a full dump position, partially returned, rotated to full dump position again and then fully returned for another cook cycle.

Buzzer Cycle

It will also be appreciated that during the six second duration from second 203 to about second 209, cam 83 rotates detent position $D_1$ past arm 88a so that arm falls into the detent, closing switch 88 at about second 205. This energizes relay switch to close a circuit along and through lines 111, 112, switch 113, line 114, contact arm 110a, line 116, contact arm 110b and line 115 to buzzer 76 to activate that buzzer. Also, power from source P is transmitted along line 100 both to the buzzer and through the upper N.O. contact to buzzer stop switch. When cam 83 rotates detent $D_2$ past arm 88a at about second 209, switch 88 is opened disconnecting line 111 et. seq. Nevertheless, power from line 100 has latched the relay in a closed condition through the upper relay contact N.O., closed switch 113, line 112 and the relay coil. This keeps the buzzer going until switch 113 is manually opened by an operator.

Of course, while a particular timing sequence has been described, many other timing sequences and durations can be used.

Jog Switch Operation

It will be appreciated that the switch 90 also provides for instantaneous and manually controlled "jogging" or rotation motion of the kettle 18, such as for removal and cleaning purposes. In this regard, switch 90 is manually held in its "jog" or manual position which is "up" as viewed in FIG. 5A. Contact arm 90a is connected to line 95, contact arm 90b to line 94 and contact arm 90c from power line 91 to contact e on line 118. Power from line 91 is conducted thus to arm 90b, contact c, line 94 and line 107 energizing cam control motor 78 to rotate shaft 84. Power is also conducted through line 118 to line 95 and common power line 93. As long as switch 90 is held in that position, the master cam 80, dump cam 81, return cam 82 and buzzer cam 83 are rotated as explained above and with the same effect to the rotation of kettle 18 (except power to cam motor 78 is continuous through line 94). At any time, such as when the stub 52 and recess 62 of kettle 18 is aligned with opening 64 in socket 53, switch 90 is released, disconnecting all power to cam motor 78 and dump motor 58, allowing the kettle 18 to be removed for cleaning.

Once it is cleaned, the jog switch 90 can again be held up, to finish the cycle and released at the end. Alternatively, and preferably, it may be actuated only to allow rotation of kettle 18 to a position in which it cannot be removed. When the switch 90 is released, the kettle is stopped.

It will be appreciated that arm 85a may still be up on cam 80. Thus, if the switch 90 is turned to its master "on" position (i.e. down in FIG. 5A), the cam motor is powered through lines 93, 101 and 107 until switch arm 85a falls into detent $A_1$-$A_2$ opening switch 85 and stopping cam motor 78. The controller 75 is thus reset for another full cooking and dump cycle upon operation of timer start switch 71.

Several other mechanical features of this operation will be appreciated. For example, when the tilt or dump motor 58 is operated to tilt the kettle, it will be appreciated that the upper pilot end 27 of the rotor or stir drive shaft 26 is tilted or moved outwardly from the socket 31 of the rotor drive housing 32. Thereby, the gear 28 is disconnected from the drive gear 34 so that action of the rotor is stopped and so that the rotor drive is disconnected from the rotor drive motor 68. On return, it will be appreciated that the upper pilot end 27 of the drive shaft 26 is again received in the socket, which serves to facilitate the intermeshing of the gears 28 and 34 for again driving the rotor within the kettle. Preferably, the mechanical return of the kettle from its dump to its cooking position takes less than six seconds. A slight motor overdrive insures it is returned to its full cooking position.

It will also be appreciated that as the tilt motor 58 is operated by the various switches as discussed above, the drive shaft 48 is turned to rotate the worm gear 49 and thereby the gear 51. This rotates the shaft 50 and drives the drive stub 52 in order to rotate the drive boss 60, which is preferably manufactured integrally with the kettle 18, thereby tilting the kettle to a cooking position. At the same time, it will be appreciated that the socket 53 in the drive housing 40 serves to rotatably hold the drive boss 60 therein. Since the socket opens upwardly, the force of gravity tends to hold the kettle and the drive boss 60 within the socket.

When the kettle is cleaned, as described above, switch 90 is used to momentarily actuate the controller motor 78 and thereby the tilt motor to move the kettle 18 to a position intermediate its cooking position and its full dumping position. In this intermediate position, the plane of the drive stub 52 is aligned with the opening 64 in the socket 53, thereby permitting the drive boss 60 of the kettle to be lifted out of the socket. In this regard, it will be appreciated that the jog switch 90 is connected so as to function to discontinue the power to the controller motor, such that the drive system can be stopped at this position. Thereafter when the kettle is reinserted and remounted, the switch 90 is released and the kettle operation is in mid-cycle. Cam 80, having been slightly rotated by the operation of the jog position of master switch 90, maintains now the controller motor 78 in an operating condition until a complete cycle has been run, so that the operator never need worry about exactly what condition or what part of the cycle the machine is in after it has been stopped, for example, by a power interruption or for cleaning. Operation of jog or master switch 90 to a norm "on" (i.e. down) position automatically recycles or resets the controller 75 and the kettle 18 to a zero start position.

It is preferable, for example, to run the popper 10 by actuation of the timer start switch 71 one or two cycles before loading the kettle with oil and popcorn. This allows time to make sure the kettle is heated up to popping temperature and, as well, further insure that the popper is recycled to zero so that a complete cycle will be maintained upon the next actuation of the cycle switch.

It will also be appreciated that, for cleaning purposes, when the drive boss is lifted out of the socket, the whole kettle can be pushed in a direction along the pivot axis 22 in the direction of the hanger bracket 41. Since the hanger bracket 41 and particularly the depending leg 43 thereof, is preferably manufactured like a flex spring, such as from stainless spring steel, that bracket may flex to permit this motion by the kettle. Of course, the drive housing and socket can be configured to provide the sole support for the kettle 15 18. After the drive boss 60 has cleared the socket in which it resides, the hanger boss 61 is merely lifted out of the hanger bracket 41 so that the entire kettle can be removed for cleaning. Of course, the kettle would also be unplugged from, for example, the power plug at the top 21 of the cabinet, so that the whole kettle can be quickly and easily removed and cleaned.

Having described the apparatus and operation of the popper according to the invention, it will be appreciated that if offers significant advantages to the old manually tiltable poppers which required rather constant operator attention to avoid, for example, the burning of popcorn or oil in the kettle. For example, once the kettle 18 is loaded with oil and corn, the master switch 90 turned on, and the timer start switch 71 energized, the complete cooking and dump cycle takes place automatically. Once the last kettle return is started, the buzzer audibly notifies the operator that cooking and dumping is completed, whether or not the operator is present at the popper at that time, or is busy with other responsibilities.

The kettle 18 is dumped twice, thereby ensuring a full dump of popcorn into the cabinet of the popper and thereafter the kettle remains heated (it can be thermostatically controlled), awaiting a new popping cycle. When the operator returns to the popper, it is only necessary for him to load the popper with oil and popcorn and to again manually operate the timer start switch 71, at which time a complete new cooking and dump cycle is initiated. It is not necessary for the operator to remain at the machine to ensure that the popcorn is not burnt. Accordingly, it is not necessary for the operator to feel that he must wait until he can give his undivided attention to the popping and dumping cycle in order to initiate the production of further popcorn. After he loads the kettle and pushes the timer start switch 71, he is free to again attend to other duties and may return to the popper 10 at his leisure, even after a complete cooking and dump cycle is completed. Accordingly, overall production rate can be increased, since there are no delays awaiting the operator's constant attention to the popping cycle.

It will be appreciated that a number of switches and circuitry are used which are not pertinent to the present invention. For example, the popper 10 can be provided with warmers, warming lights or other decorative lights. It can be provided with a heat lamp or a warming fan and with switches and thermostats for operating kettle heat and for operating the motor for the stirrer rotor. None of these or their functions constitute a part of the invention.

It will also be appreciated that while an audible signal such as a buzzer is utilized to inform the operator that the cooking and dump cycle has been completed, it is not necessary for him to immediately return to the popper, yet the audible signal will continue to alert the operator that the popper 10 is ready to be loaded for another popping and dump cycle, until the operator manually pushes or opens switch 113. Accordingly, the popping of popcorn in consecutive batches is facilitated without requiring the constant attention of an operator, the only manual control required being the loading of the kettle with oil and popcorn and the actuation of the timer start switch 7. It will also be appreciated, of course, that the loading of oil and popcorn into the kettle could itself be automated upon the actuation, or in response to the actuation, of a cycle switch or time start switch. The timer could be programmed to allow for load time. Even where this alternative is utilized, it is not necessary for the operator to dedicate his constant attention to the popper as the popcorn will be popped and then dumped automatically.

These and other alternatives and modifications will be readily appreciated from the foregoing description by one of ordinary skill in the art without departing from the scope of this invention and the applicant intends to be bound only by the claims appended hereto:

We claim:

1. Apparatus for popping popcorn comprising:
 a tiltable popcorn popping kettle,
 a motor operatively and directly coupled to tilt said kettle from a corn popping position to dump popped popcorn from said kettle, and
 a motor control for operating said motor to selectively tilt and dump said kettle, and to return said kettle to said corn popping position,
 wherein said motor control is coupled to operate said motor to partially return said kettle to a corn popping position, and then to fully tilt said kettle to dump it again, and then to fully return said kettle to said corn popping position.

2. Apparatus for popping popcorn comprising:
 a tiltable popcorn popping kettle,
 a motor operatively and directly coupled to tilt said kettle from a corn popping position to dump popped popcorn from said kettle, and
 a motor control for operating said motor to selectively tilt and dump said kettle, and to return said kettle to said corn popping position,
 wherein said motor control automatically operates said motor when popcorn has cooked in said kettle, and further including a circuit for manually overriding said automatic operation and operating said motor manually.

3. Apparatus as in claim 2 further including a control apparatus to reset said automatic control to a zero start condition after an interruption in said automatic operation.

4. Apparatus for popping popcorn and including:
 a tiltable popcorn popping kettle,
 a motor operatively and directly coupled to tilt said kettle from a corn popping position to dump popped popcorn from said kettle,
 a motor control for operating said motor to selectively tilt and dump said kettle, and to return said kettle to said corn popping position, and
 a kettle tilt drive operably interconnecting the kettle to the motor,
 wherein said motor control includes a timer for controlling operation of the motor to tilt the kettle and dump popped corn therefrom;
 said timer initiating operation of said motor to tilt said kettle and dump popped popcorn therefrom after a timed duration for popping said popcorn in said kettle.

5. Apparatus as in claim 4 further including:
 a controller for initiating and stopping rotation of said tilt motor in one direction for dumping popped popcorn and for initiating and stopping rotation of said motor in a reverse direction for returning a tilted kettle to a non-tilted cooking position.

6. Apparatus as in claim 5 including a motor for driving said controller, said timer being operatively connected to start said controller motor for tilting said kettle.

7. Apparatus as in claim 5 wherein said controller is operable to initiate and stop said tilt motor twice in each of said directions for twice dumping said kettle after corn is popped therein.

8. Apparatus as in claim 7 wherein said controller includes apparatus for operating said controller motor continuously during said initiating and stopping of said tilt motor.

9. Apparatus as in claim 4 wherein said kettle includes a drive boss and a hanger boss, and said apparatus further includes a kettle drive shaft operably interconnecting said tilt motor with said kettle for dumping said kettle.

10. Apparatus as in claim 9 including apparatus for tiltably mounting said kettle including a drive housing containing said drive shaft and having a socket for receiving said drive boss for rotation therein, a drive stub interconnected to said drive shaft and said drive stub extending into said socket and releasably extending into said drive boss for tilting said kettle about a tilt axis upon rotation of said tilt motor.

11. Apparatus as in claim 10 further including a hanger spaced from said drive housing for rotatably supporting said hanger boss.

12. Apparatus as in claim 11 including a groove on said hanger boss, said hanger comprising a flat spring having a hanger boss receiving support aperture therein, said hanger boss releasably disposed in said aperture with portions of said spring defining said aperture disposed in said groove.

13. Apparatus as in claim 12 wherein said kettle is removable from said socket and said hanger by pressing said kettle toward said yieldable hanger to extract said drive boss from said socket, and then by pulling said hanger boss from said aperture.

14. Apparatus as in claim 12 wherein said kettle, said drive housing and hanger are disposed in a rectangular-shaped cabinet having four walls and wherein said kettle's tilt axis is oriented at an angle to each wall.

15. Apparatus as in claim 14 wherein said tilt axis is horizontally disposed and is oriented at an angle of about 55 degrees with respect to a back wall of said cabinet.

16. Apparatus for popping popcorn including a tiltable kettle mounted in a cabinet for popping popcorn and dumping popped popcorn into said cabinet, said apparatus comprising:

a tilt motor for tilting said kettle;

a drive link operably interconnecting said tilt motor directly to said kettle;

a timer;

a dump controller operably interconnected to said timer for operating said tilt motor to dump popped popcorn in response to a signal from said timer; and a return controller for operating said tilt motor to return said kettle from dumping popped popcorn to a corn popping position.

17. Apparatus as in claim 16 herein said controller includes apparatus for operating said tilt motor in one direction to tilt said kettle and in another direction to return said kettle to a corn popping position.

18. Apparatus as in claim 17 wherein said controller includes apparatus for operating said tilt motor twice in said direction to tilt and return said kettle twice to twice dump popped corn therefrom.

19. Apparatus as in claim 17 further including an audible signal generator connected to said timer for generating an audible signal in response to a signal indicating dumping of corn from said kettle is complete.

20. Apparatus as in claim 19 including a manually-operably switch for resetting said timer.

* * * * *